US006266103B1

United States Patent
Barton et al.

(10) Patent No.: US 6,266,103 B1
(45) Date of Patent: Jul. 24, 2001

(54) METHODS AND APPARATUS FOR GENERATING CUSTOM GAMMA CURVES FOR COLOR CORRECTION EQUIPMENT

(75) Inventors: Nicholas Barton, Fort Lauderdale; Sanjay Devappa Rai; Xueming Henry Gu, both of Ft. Lauderdale, all of FL (US)

(73) Assignee: Da Vinci Systems, Inc., Ft. Lauderdale, FL (US)

( * ) Notice: Subject to any disclaimer, the term of this patent is extended or adjusted under 35 U.S.C. 154(b) by 0 days.

(21) Appl. No.: 09/603,452

(22) Filed: Jun. 26, 2000

Related U.S. Application Data

(63) Continuation of application No. 09/282,911, filed on Mar. 31, 1999, now abandoned.
(60) Provisional application No. 60/080,619, filed on Apr. 3, 1998.

(51) Int. Cl.[7] .................................................. H04N 9/69
(52) U.S. Cl. ............................................ 348/675; 348/674
(58) Field of Search .................................... 348/674, 675, 348/676, 677, 254, 256; 382/167; 358/518, 519; 345/431; H04N 9/69

(56) References Cited

U.S. PATENT DOCUMENTS

| | | | |
|---|---|---|---|
| 4,710,800 | 12/1987 | Fearing et al. | 358/22 |
| 4,782,384 | 11/1988 | Tucker et al. | 358/22 |
| 4,908,874 | 3/1990 | Gabriel | 382/41 |
| 4,952,051 | 8/1990 | Lovell et al. | 352/87 |
| 4,954,881 | 9/1990 | Kaye | 358/22 |
| 5,050,984 | 9/1991 | Geshwind | 352/38 |
| 5,051,928 | 9/1991 | Gruters | 364/521 |
| 5,252,953 | 10/1993 | Sandrew et al. | 345/122 |

(List continued on next page.)

FOREIGN PATENT DOCUMENTS

| | | | |
|---|---|---|---|
| 0 488 974 A2 | 6/1992 | (EP) | H04N/1/00 |
| 0 583 898 A2 | 2/1994 | (EP) | G06F/15/68 |
| 0 609 567 A2 | 8/1994 | (EP) | G06F/15/68 |
| WO 87/06419 | 10/1987 | (WO) . | |

OTHER PUBLICATIONS

The Renaissance 8:8:8 User's Guide (version 1.7, Sep. 1, 1996), Chapter 5.
The Da Vinci Renaissance 8:8:8 User's Guide (version 1.7, Sep. 1, 1996), Chapter 6.
Understanding Color Maps, Picture Publisher 5.0 User's Guide, Web Edition, 1996 by Micrografx, Inc.
Adobe Photoshop User Guide (version 4.0, pp. 146–151).
Matsuyama et al., Multiply Descent Cost Competitive Learning as an Aid for Multimedia Image Processing, Proceeding of 1993 International Joint Conference on Neural Networks, Oct. 28, 1993.
The Renaissance 8:8:8 User's Guide (preliminary version 1.5, Nov. 1, 1995) Chapter 1.

*Primary Examiner*—Sherrie Hsia
(74) *Attorney, Agent, or Firm*—Morris, Manning & Martin, LLP

(57) ABSTRACT

A control point based real time primary custom gamma curve generator for color correction equipment. A separate custom gamma curve generator circuit is provided for each of the RBG and luminance channels. A plurality of control points is provided and stored in a lookup table (LUT) stored in a random access memory (RAM). The control points are set and/or adjusted by the operator or loaded from a pre-stored set (e.g. a default custom gamma curve). The instantaneous input signal is divided into two portions—a control point address portion comprising the most significant bits (MSBs) of the input signal, and an interpolation address portion comprising the least significant bits (LSBs) of the input signal. The MSBs are used to select a particular control point value stored in RAM. The LSBs are used for interpolation of values with a smooth curve between control points. Also described are various user interfaces for the custom gamma curve generator.

65 Claims, 9 Drawing Sheets

U.S. PATENT DOCUMENTS

| | | | |
|---|---|---|---|
| 5,327,501 | 7/1994 | Kato et al. | 382/44 |
| 5,450,500 | 9/1995 | Brett | 382/162 |
| 5,495,540 | 2/1996 | Frankot et al. | 382/294 |
| 5,506,946 | 4/1996 | Bar et al. | 395/131 |
| 5,506,949 | 4/1996 | Perrin | 395/152 |
| 5,530,774 | 6/1996 | Fogel | 382/154 |
| 5,850,471 | 12/1998 | Brett | 382/162 |
| 5,874,988 | 2/1999 | Gu | 348/97 |
| 5,929,417 | 7/1999 | Hayashi et al. | 235/454 |

CUSTOM CURVE USER INTERFACE - VALUES

CUSTOM CURVE USER INTERFACE - BARS

```c
#include <stdio.h>
#include <math.h>
#include <conio.h>
include <stdlib.h> define RESOL 4096
define HIBITS 32 //the number of control points
#define LOBITS (RESOL/HIBITS ) //the number of fractional
positions
#define FNBITS RESOL //the resolution of the interpolation
function
#define PI 3.14159
define POINTS 3 //the interpolation aperture //This calculate the interpolation function
int interp_function( float x )
{
if ( x = = 0) return( FNBITS ) ;
// else return( (int) ( FNBITS * sin(x * POINTS/(POINTS-1)
)/(x * POINTS/(POINTS-1)))*
(1 + cos(x) )/2) ;
     else return( int) (FNBITS * sin(x )/(x))*( 1 ± cos(x)
)/2) ;
} void main( void)
{   int v, i , p, sum ;
    int fn[ LOBITS ] [ POINTS ] ;
    float x , angle ;
    int table[ HIBITS ], out ;
    FILE *fP1, *fp2, *fp3, *fP4, *fP5, *fp6, *fp7;

fp3 = fopen( "sync_nl.dat" , "w+" ) ;
        fp4 = fopen( "sync_0.dat" , "w+" ) ;
        fp5 = fopen( "sync_pl.dat" , "w+" ) ;
        fp7 = fopen( "sync_func.dat" , "w+" ) ;

printf("Interpolation..\n") ;
        for( v = 0; v < LOBITS; v++)
        {
            angle = (float)v * 2/POINTS/LOBITS ;
            for( i = 0, sum = 0 ; i < POINTS; i++ )
            {
                x = (1 - 2*( POINTS - (float)i - 1 )/POINTS ) -
            angle ;
                //printf("x=%f a=%f\n", x, angle) ;
                x *= PI ;
                fn[v][i] = interp_function( x ) ;
                sum += fn[v][i] ;
            }
```

FIG. 8A

```
        }
        for( i = 0 ; i < POINTS; i++)
        {
            fn[v][i] = (fn[v][i] * FNBITS)/sum ;
        }
        for( i = 0, sum = 0 ; i < POINTS; i++ )
        {
            sum +=fn[v][i] ;
        }
        //Correct the gains
        if (sum == FNBITS-1 )

{
            fn[v][POINTS/2 ] += 1 ;
            sum +=1 ;
        }
        else
        {
        if   ( sum == FNBITS -2 )
        }
            fn[v][POINTS/2 + 1]+=1;
            fn[v][POINTS/2 ]+=1;
            sum += 2 ;}
    }
    for( i = 0; i < POINTS; i++ )
    {
        fprintf(fp7,"%d\n",fn[v][i]);
    }
//   printf("%d \n", sum ) ;
//   getch() ;

fprintf(fp3,"%d\n",fn[v][0]);
fprintf(fp4,"%d\n",fn[v][1]);
fprintf(fp5,"%d\n",fn[v][2]);
}
srand( 0 ) ;

fp6 = fopen("control.dat","w+");

for( v = 0; v < HIBITS; v++ )
{
    //gamma table
    table[v] = (int)( FNBITS * pow( v-POINTS/2
    ,0.45)/pow(HIBITS-1, 0.45) ) ;
    fprintf(fp6,"%d\n",table[v]);
    //random numbers
    //table[v] = (int) ( ( (float) rand() * FNBITS )/
    RAND_MAX) ;

```
//You can import results file Data.txt into Excell to get a
graph
fp1 = fopen( "INPUT.dat" , "w+" );
fp2 = fopen( "OUTPUT.dat" , "w+" );

//Do the Interpolation
for(v = 0; v < HIBITS; v++)
{
   for( i = 0 ; i < LOBITS; i++ )
   {
      for( p = 0, out = 0; p < POINTS; p++ )
       {
          sum = v + P - POINTS/2;
          if(sum < 0)
             sum = 0;
          else if (sum > HIBITS - 1)
             sum = HIBITS - 1;

out += fn[i][p] * table[sum];
       fprintf(fp1,"%d x %d  ",fn[i][p], table[sum] ) ;

}
      out /= FNBITS ;
      fprintf(fp1,"=> %u\n", out);
      fprintf(fp2,"%d \n", out) ;
      //getch();
   }
}
fclose( fp1 ) ;
fclose( fp2 ) ;
fclose( fp3 ) ;
fclose( fp4 ) ;
fclose( fp5 ) ;
fclose( fP6 ) ;
fclose( fp7 ) ;
```

FIG. 8C

METHODS AND APPARATUS FOR GENERATING CUSTOM GAMMA CURVES FOR COLOR CORRECTION EQUIPMENT

CROSS REFERENCES TO RELATED APPLICATIONS

This application is a continuation of application Ser. No. 09/282,911, filed Mar. 31, 1999, abandoned, which claims the benefit of Provisional Application No. 60/080,619, filed Apr. 3, 1998.

TECHNICAL FIELD

The present invention relates generally to image processing, and more particularly relates to an improved method and apparatus for setting custom input/output relationships for the gain, gamma and lift parameters of the luminance, red, green, and blue primary video signals in the primary signal processing stage of video signal color correction equipment in real time.

BACKGROUND OF THE INVENTION

In certain types of image processing systems, especially color correction systems employed in postproduction equipment, system operators observe an image on a video monitor, adjust color and other parameters of the image until it is aesthetically satisfactory, store the parameters in system memory, and apply the parameter corrections to a sequence of images forming a scene. Various types of image processing are often employed to create, enhance, compress, filter, or otherwise modify characteristics of an image. In a video signal color correction system, color corrections of motion picture film and/or video tape are typically made on a scene-by-scene basis. A "scene" is a sequential collection of images shot from the same camera, having the same viewpoint, composed in a certain way, etc. A system operator or "colorist" views a selected exemplary image or frame from a scene. The colorist then applies color corrections via a control panel to adjust video parameters such as hue, saturation, luminance, etc. of a frame image being viewed. The correction settings are stored in system memory.

After the colorist is satisfied with the adjustments he or she has made to the selected frame, the correction system, which is typically computer-controlled, applies the stored color corrections to each frame in the scene one at a time. The color-corrected frames of the scene are then recorded on film or videotape. The steps are repeated for other scenes in the film or video tape, often with different correction settings stored for different scenes. This process creates a color-corrected master film or video tape that reflects color adjustments to all frames in all scenes.

Many types of color correction equipment employed as the source of images for processing provide signals in the primary colors of red, green, and blue (RGB). These signals are typically digital, or are digitized by digitizing equipment prior to color correction processing. In present day equipment, the primary video signals are often provided in a format promulgated by the International Radio Consultant Committee (CCIR), Recommendation No 601-1. The CCIR in 1986 defined a standard set of digitized color signals for television studios. CCIR Recommendation 601-1 (1986) is hereby incorporated by reference.

The standard signals defined in Recommendation 601-1 essentially consist of a luminance signal Y and two color difference signals (R-Y) and (B-Y). It is well known that since the luminance signal contains information on levels of red, green, and blue, the three standard signals can be used to unambiguously reproduce the RGB levels for any given set of samples.

It is well known that certain aspects of the RGB signals from image source equipment are nonlinear with respect to color imagery and that it is advantageous to adjust these aspects prior to processing with color correction equipment. For example, it is well known that the gain, gamma, and lift parameters of the signal from various types of image sources often need alignment or adjustment prior to processing, because of the nonlinearity of these sources. These parameters of gain, gamma, and lift are typically represented as a "gamma curve".

Basically, custom gamma is a numerical factor used for indicating how light values are expanded or compressed. Typically, the relationship between the input and output of a typical video channel is graphically represented as a non-linear relationship or curve by depicting the output on the y-axis relative to the input on the x-axis. The numerical value of gamma is proportional to the deviation from a straight line to the curve. A curve with positive gamma value is bowed upward, with the greatest slope at the start and a relative flat part at the end. A curve with negative gamma value is bowed downward, making the start of the curve comparatively flat while the steeper slope is at the end. A gamma of zero results in a straight line, with a constant slope.

The gain parameter on a gamma curve represents numerical multiplicative factor at the highest output level relative to the highest input level. For example, if an input signal reaches a peak level of 1, and the output signal is at 1.5, the gain is therefore 1.5.

The black level or lift parameter of a gamma curve is a function of the output signal for the lowest value of input signal. If the input signal is or is supposed to be 0, which represents a black region of an image, but the image source equipment provides a positive output value for the zero input signal, the signal is said to experience a "lift" or an increased black level. This is also the point at which the gamma curve intersects the y-axis. Often, the lift must be adjusted in each of the RGB channels so as to provide a uniform black.

It is known in the art to provide customized gamma curve equipment at the input stage of color correction equipment so as to provide for gain, gamma, and black level adjustment for signals from various image sources. The Renaissance 8:8:8™ color correction equipment is a computer-controlled color correction system manufactured by the assignee of the present invention. This system allows an operator to define gamma curves for each of the RGB and luminance channels in a customized manner. The "Custom Curve" feature of the Renaissance 8:8:8™ equipment allows the operator to adjust the shape of gamma curve by software manipulation, via a graphical user interface. These curves can be altered beyond the standard amount of "stretch" or "crush". Without affecting the value of middle grays in an image, the Custom Curves feature adds extra density to the darker shadows while allowing compression of the tonality range of highlights. This enhances middle contrast and simultaneously avoids clipping, and produces richer, vibrant colors.

The known Custom Curves feature also allows an operator to select a point along a custom gamma curve and independently pull on each color channel's primary balance without regard to what might be occurring at any other level of color enhancement. This allows creation of a totally unique gray scale response for each color channel.

With the Custom Curves feature, an almost unlimited variety of primary color effects are possible. The Renaissance 8:8:8™ equipment allows an operator to switch, dissolve, or window between various effects on a scene by scene basis. The Custom Curves can be defined differently for each color correction session and then stored independently and automatically.

To allow user access to the Custom Curves feature, operator controls are provided on the Renaissance 8:8:8™ control panel. A number of "soft keys" (actuatable buttons on a display screen associated with the computer-controlled equipment) allow selection of a particular custom gamma curve for channels, for example of luminance, red, green, and blue. A Custom Curves features window appears on the operator's workstation window. The operator can visually inspect the shape of the gamma curve for the luminance, red, blue, and green channels. The custom gamma curves in this prior system can also be selected by clicking directly on a curve using a pointer and mouse. To create or adjust a custom gamma curve, the operator places the cursor on an appropriate curve, holds down the left mouse button, and drags the curve to a new shape. The operator can also place the cursor at the point in the display window for the curve and click; the curve will snap to that location. A colored defined "control point" dot appears as the user interface feedback at the new position on the curve. In this prior system, up to four deemed control points can appear on each curve.

Similarly, to delete a defined control point on a custom gamma curve, the operator places the cursor on or near the point and double-clicks the left mouse button. Double-clicking the left mouse button while the cursor is on a custom gamma curve sets the curve to unity, which as described above is a straight line. At unity, of course the gamma control has no effect.

The setting of each custom gamma curve in this prior equipment can be saved to five user memories per color channel. The operator can assign a name or a comment to the curve by clicking in a comment area and typing in an appropriate text message. A sixth soft key button recalls a default curve, which is not adjustable. Thus, a set of five user memories are provided per color channel, storable in a configuration file.

In the prior Renaissance 8:8:8™ Custom Curves equipment, the process of defining the curve is computationally and memory intensive. A large lookup table comprising a 16K×16 is provided for storing all possible values of the custom gamma curve for all possible values of a 14-bit input signal, which allows storage of a discrete value for the custom gamma curve for each of R, G, B, and luminance.

A significant problem with this approach is that the entire 16K×16 array must be computed and loaded for each different custom curve for each channel; changing a custom curve to implement an effect between one frame and the next entails loading all values of the entire array in a very short time. It has proven impractical to recompute and refill a 16K×16 bit array on a per-frame basis, thereby effectively limiting the effects that can be implemented.

Moreover, for instantaneous small values of gamma (i.e. steep slopes), there can be discontinuities between bitwise adjacent values of the input signal, notwithstanding the 14-bit resolution. This is because of the basic piece-wise linear approach of storing discrete values. Such discontinuities can result in noticeable artifacts in the output signals.

Accordingly, there is still need for improvement in the custom gamma curve type feature in the primary channel processing for color correction equipment that provides superior performance for real time image processing. There is also a need for an improved custom gamma curve generator that generates a smooth curve through a fixed number of arbitrarily defined control points.

SUMMARY OF THE INVENTION

The present invention provides an improved control point based real time primary custom curve generator for color correction equipment. A separate custom gamma curve generator circuit is provided for each of the RGB and luminance channels. A plurality of control points (32 in the disclosed embodiment) is provided and stored in a lookup table (LUT) stored in a random access memory (RAM). These control points are set and/or adjusted by the operator, or loaded from a prestored set (e.g. a default custom curve). The instantaneous input signal is divided into two portions—a control point address portion comprising the most significant bits (MSBs) of the input signal, and an interpolation address portion comprising the least significant bits (LSBs) of the input signal. The MSBs are used to select a particular control point value stored in RAM. The LSBs are used for interpolation of values with a smooth curve between control points.

In the disclosed embodiment, with a 14-bit input signal resolution, the 5 MSBs are used to select one of 32 possible control point values. The 9 remaining LSBs are used to select interpolation function values.

A predetermined interpolation function is precalculated and stored in a read only memory (ROM) lookup table; the interpolation is based on a control point before and a control point after a given control point selected with the MSBs.

The output of the control point lookup table for a particular control point is then multiplied with its corresponding interpolation function value from the interpolation function ROM lookup table. The results of all the taps are added to form the final interpolated sample. The output is a smooth transition between the control point value immediately preceding a given control point and the control point value immediately following the given control point.

With the present invention, an operator can provide a number of different custom gamma curves for various types of image source equipment, and can provide custom sets of custom gamma curves to provide various effects on the primary color channels in a real time basis. The primary custom gamma curve generator can operate on a real time basis to implement and provide these primary effects prior to any subsequent color correction.

Also provided in the present invention is a special gamma curve "knee" function generator. This knee function generator allows creation of a custom gamma curve "bump" or "knee" that can be positioned anywhere along the gamma curve. The bump or knee can be adjusted in location, width, and slope so as to provide a localized "subgamma curve." This facilitates implementation of custom localized gamma curve effects at any point desired by an operator.

Also provided in the present invention are improved user interfaces for a system incorporating the described control point based real time primary custom gamma curve generator. The improved user interfaces allow several different "views" or approaches to setting the gain, gamma, and lift of a custom gamma curve.

These and other features and advantages of the present invention may be more clearly understood and appreciated from a review of the following detailed description of the disclosed embodiment and by reference to the appended drawings and claims.

BRIEF DESCRIPTION OF THE DRAWINGS

FIG. 8, consisting of FIGS. 8A, 8B, and 8C, is a C++ printout of an interpolation function according to the invention.

DETAILED DESCRIPTION OF THE DISCLOSED EMBODIMENT

Figure 1:
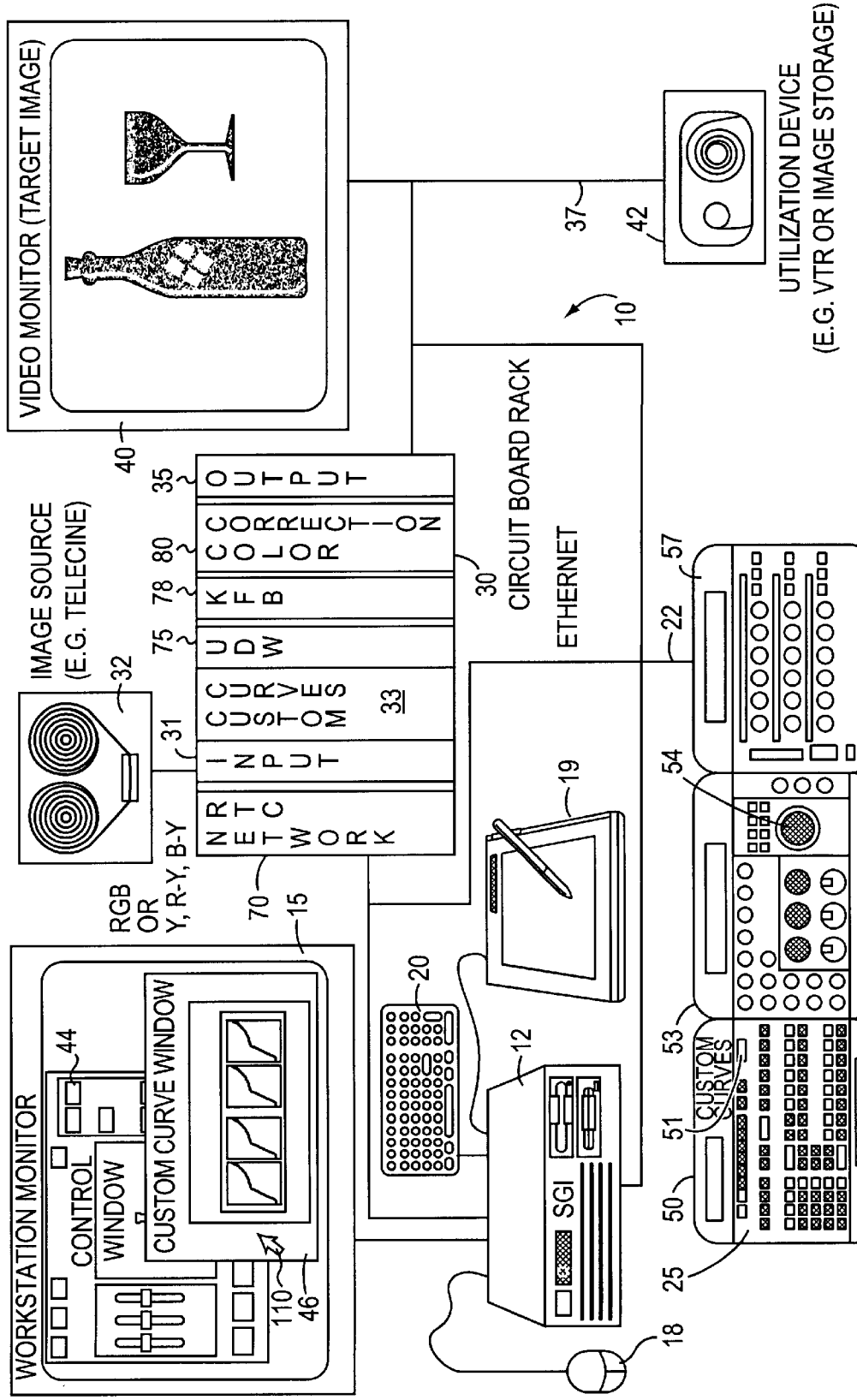
FIG. 1 is a block schematic diagram of an image processing system suitable for employment of the custom gamma curve generator constructed in accordance with the preferred embodiment of the present invention.

Referring now to the drawings, in which like numerals indicate like elements or steps throughout the several figures, FIG. 1 illustrates an image processing system 10 constructed in accordance with the preferred embodiment of the present invention, suitable for employing the custom gamma curves invention described herein.

Preferred Embodiment of Color Correction System

Although the present invention will be described in the context of a scene by scene digital color corrector, it will be understood that the inventions described herein are not limited to video color correction and are equally useful in other types of systems, particularly image processing equipment, where there is a need for adjustment to nonlinear aspects of signals prior to subsequent signal processing. However, in the context of the disclosed embodiment, the inventions are particularly useful in a scene by scene color corrector where a plurality of frames comprising a scene must be viewed and adjusted to create or modify a video program such as a movie, commercial, television program, etc.

An image processing system 10 constructed in accordance with the preferred embodiment comprises several basic components—a computer-based workstation 12 including monitor 15 and keyboard 20, a colorist's control panel 25, a digital color correction system 30, a source of images 32, a video monitor 40, and a destination for corrected images 42. The workstation 12 preferably includes pointing devices such as a mouse 18 and/or graphics tablet 19. The workstation 12 is coupled for data communications via a network connection 22, preferably a high speed network such as Ethernet, to the color correction system control panel 25 and color correction system 30.

The source of images 32 may be a telecine, video tape player, or a digital video storage medium. The source is connected to an Input circuit board 31 in the color correction system 30. It will be understood that the image signals internal to the color correction system 30 are digital, and are stored and manipulated in a digital video format such as the International Radio Consultant Committee (CCIR) promulgated Recommendation No. 601-1 which defines a standard set of digitized color signals. CCIR Recommendation 601-1 (186) is hereby incorporated by reference. It is known in the art to take CCIR 601-1 digitized signal streams, convert same to corresponding RGB signals (in analog or digital domains), and then to perform the primary and secondary color corrections and modifications on the resultant signals. The corrected or modified signal can then be passed through a signal matrix and reconverted to a digital bit stream through use of an analog to digital converter. The standard signals defined in Recommendation 601-1 essentially consist of a luminance signal Y and two color difference signals (R-Y) and (B-Y). It is well known that, since the luminance signal contains information on levels of red, green and blue (RGB), the three standard signals can be used to reproduce the RGB levels for any given set of samples.

For purposes of the description of the present invention, the primary color signals red, green, and blue (RGB) will be described as the subjects of the custom gamma curves, although it will be understood that the source signal may be in the original form of Y, R-Y, and B-Y.

A custom gamma curve circuit 33 constructed in accordance with the present invention is provided to receive the RGB signals and implement the custom gamma curves as described herein. The output of the custom gamma curve circuit is provided to other components of the color correction system 30 which do not form a part of the present invention.

An Output circuit board 35 is provided as a part of the color correction system 30, and typically converts the digital signals after processing within the color correction system back into analog form for display. The Output circuit 35 is coupled via a video signal cables 37 to a video monitor 4a0 and to a utilization device 42 such as a video tape player or other image storage device. Alternatively, the corrected digital signals can be stored in digital form in a digital data storage device coupled to the system.

The preferred workstation 12 is an INDY™ model workstation manufactured by Silicon Graphics, Inc. (SGI). The preferred workstation includes an R4600 RISC processor operating in excess of 133 ZMHz, internal 24-bit XL color graphics (with RGB single or double buffer color indexes), a digital video input port capable of storing 640×480×30 fps to memory, 2 serial and 1 parallel data port, an Ethernet network port, a fast SCSI-2 data port, at least 32 megabytes of RAM, and a 1.0 or larger Gb hard disk. Optionally, a different SGI model workstation could be employed, e.g. one including a video adapter card that allows support and use of multiple monitors. Further details of the preferred workstation are available in the literature supplied by the manufacturer.

The preferred workstation 12 includes on-board display driver circuit, namely, the 24-bit XL color graphics circuitry with RGB double buffer color indexes, which provides video signals to at least one workstation monitor 15. A separate, second video monitor 40 is utilized in the preferred embodiment to display a target image, that is, a full screen representation of the video image being processed in the system. If a workstation model is employed that supports multiple monitors, the second monitor 40 may be connected to the workstation 12.

The preferred graphics tablet 19, which is particularly useful for certain manipulations in color correction system, is a Wacom ArtPad™ or ArtZ™ graphics tablet manufactured by Wacom Technology Corporation, Vancouver, Wash. 98661.

The preferred color correction system 30 is a Da Vinci RENAISSANCE 8:8:8™ digital color corrector manufactured by Da Vinci Systems, Inc., Ft. Lauderdale, Fla. This color correction system includes various circuit board components that are employed to carry out digital video signal processing and is coupled to the control panel 25. The preferred RENAISSANCE 8:8:8™ control panel 25 comprises three separate panels each having a combination of dedicated keys, soft keys, and soft knobs that provides many simultaneous functions utilized in the color correction process. A dedicated keyboard 50 contains both dedicated and soft keys for system feature control, display/list management, source and destination motion control, editing, special effects features, and the like. This keyboard also contains a slide-out alphanumeric keyboard (not shown) to enter names, comments, and other important session information. Included on this control panel is a "Custom Curves" button or key 51 that is utilized to activate the functions described herein.

It will be understood that the preferred RENAISSANCE 8:8:8™ system includes software that is operative for controlling the image source and destination, and reading and storing frame numbers in association with user-defined scene identifiers or names. Thus, the system is able to provide displays of scene lists that facilitate the user in associating scene identifiers or names with exemplary images from the scene.

The control panel 25 further includes a joyball panel 53, which includes knobs, a trackball 54 for manipulating a cursor, keys for source setup, primary color balance, color grabbing, trackball control, and other effects control. When the windows feature of the present invention is activated, movement of the trackball 54 causes generation of a cursor 110 that is displayed on the video monitor 40. The cursor 110 is utilized to manipulate and control aspects of the custom curve generator, as will be described.

Finally, the control panel 25 includes a soft panel 57, which contains knobs and softkeys for dedicated 6-color secondary enhancement, special effects control, dedicated memory keys, and other functions not forming a part of the present invention. It will be understood that the provision of primary and secondary color correction, and sets of primary and secondary color correction, can be set and stored in memory by manipulation of controls on the soft panel 57.

The color correction system 30 preferably also includes several circuit boards that provide the functions required to carry out color correction or other types of image processing in the digital domain, and to control input from the image source 32 and utilization or storage in the utilization device 42. These circuits include a real time controller (RTC) circuit 70 with network interface that provides a data communication network interface to the data communication network 22 coupling the color correction system 30 to the workstation 12 and color correction system control panel 25.

The real time controller (RTC) 70 includes a dedicated microprocessor for handling real time events. Real time events occur at the rate of one every 30 millisecond (ms), so as to maintain an event rate corresponding to at least a 33 frames per second (fps) display rate. Data comprising an events list is provided to the RTC 70 via the data communications network 22; this events list is provided to control various functions of components in the system, for example providing a set of color corrections for each frame of a specified scene being processed. In particular, the events list as employed in the present invention includes a data structure that identifies a particular frame number and scene number, information that specifies one or more user defined windows for the particular frame, information identifying color corrections to be applied to areas inside the one or more windows of the particular frame, and information identifying color corrections to be applied outside the window of the particular frame, and other information.

The events list in the preferred embodiment is a data structure having frame numbers as a time reference. The data structure comprises a sequence of data blocks, each block being related to a beginning frame number and an ending frame number. Each block is called a "scene" which corresponds to a continuous segment of film or video shots. Each block also contains a set of color correction parameters and window parameters. The color correction parameters include known parameters such as red gain, red gamma, red black, etc., for each RGB color channel.

A user definable windows (UDW) generator board 75 includes a dedicated high speed microprocessor that converts vectorized user defined windows into a video matte or key on a real time basis at the real time event rate. The RTC circuit 70 provides the vector representations of the windows to the UDW board 75 at the real time event rate.

A key frame buffer (KFB) circuit board 78 stores a video image from the image source 32, or from any other digital storage system, in a high speed memory. This image is then utilized to derive a vector representation of any user defined windows. Keys for vectorizing may be obtained directly from the image source 32 or be retrieved from prestored images stored in the memory of the workstation 12.

Further description of the UDW generator is provided in U.S. patent application Ser. No. 08/912,662, filed Aug. 8, 1997, entitled "User Definable Windows for Selecting Image Processing Regions," the disclosure of which is incorporated herein by reference and made a part hereof.

Color correction circuit 80 carries out digital color correction and other video parameter adjustment functions associated with the color correction system 30. The block in FIG. 1 identified as the color correction circuit 80 includes all of the remaining functions of the preferred RENAISSANCE 8:8:8™ digital color correction system 30, and will not be discussed further. Details of the operations and functions of the preferred color correction system 30 are available in the literature supplied by the manufacturer.

As will be understood by those skilled in the art, the preferred color correction system 30 is operative to receive video images from an image source such as telecine 32, digitize the video images, effect gamma curve correction on the primary RBG video signals, capture a digitized image in the KFB board 78, display the captured image on the video monitor 40, receive color corrections entered by the colorist or operator via the control panel 25, impose such color corrections upon video images as they are transferred through the system, and provide corrected output signals via the output board 35 which are employed or stored in a utilization device 42 and/or simultaneously displayed on the video monitor 40.

In carrying out the operations for applying image processing, a system operator or user interacts with the system through the control panel 25, and via the user interface elements of the workstation 12, namely, keyboard 20, mouse 18, graphics tablet 19, and workstation monitor 15. In particular, the workstation 12 executes computer programs for carrying out the computer-implemented methods described herein, and generates displays on the monitor 15 containing windows with user interface elements such as informational displays, control buttons, slider bars, data entry fields, image display areas, etc.

The reader should be careful here to distinguish user-interface "windows" displayed on the monitor 15 generated from execution of computer software for carrying out the custom gamma curves invention from the "user defined windows" for applying image processing. During system use, the workstation monitor 15 will typically be displaying one or more user-interface oriented windows for carrying out the methods as described herein. One such user-interface window is a control window 44, which comprises a display of various buttons and slider controls for manipulation of a key image. Activation of certain commands causes the display of other, secondary windows. One of the secondary windows is a Custom Curve window 46, shown overlapping the control window 44 in FIG. 1. The Custom Curve window 46 is used to display aspects of custom gamma curves in accordance with the invention.

In the disclosed embodiment, the results of image processing are viewed on the video monitor 40, while the user interface and controls aspects of the image processing and the invention are carried out through the workstation 12 and its associated monitor 15.

Overview of Custom Gamma Curves

Figure 2:
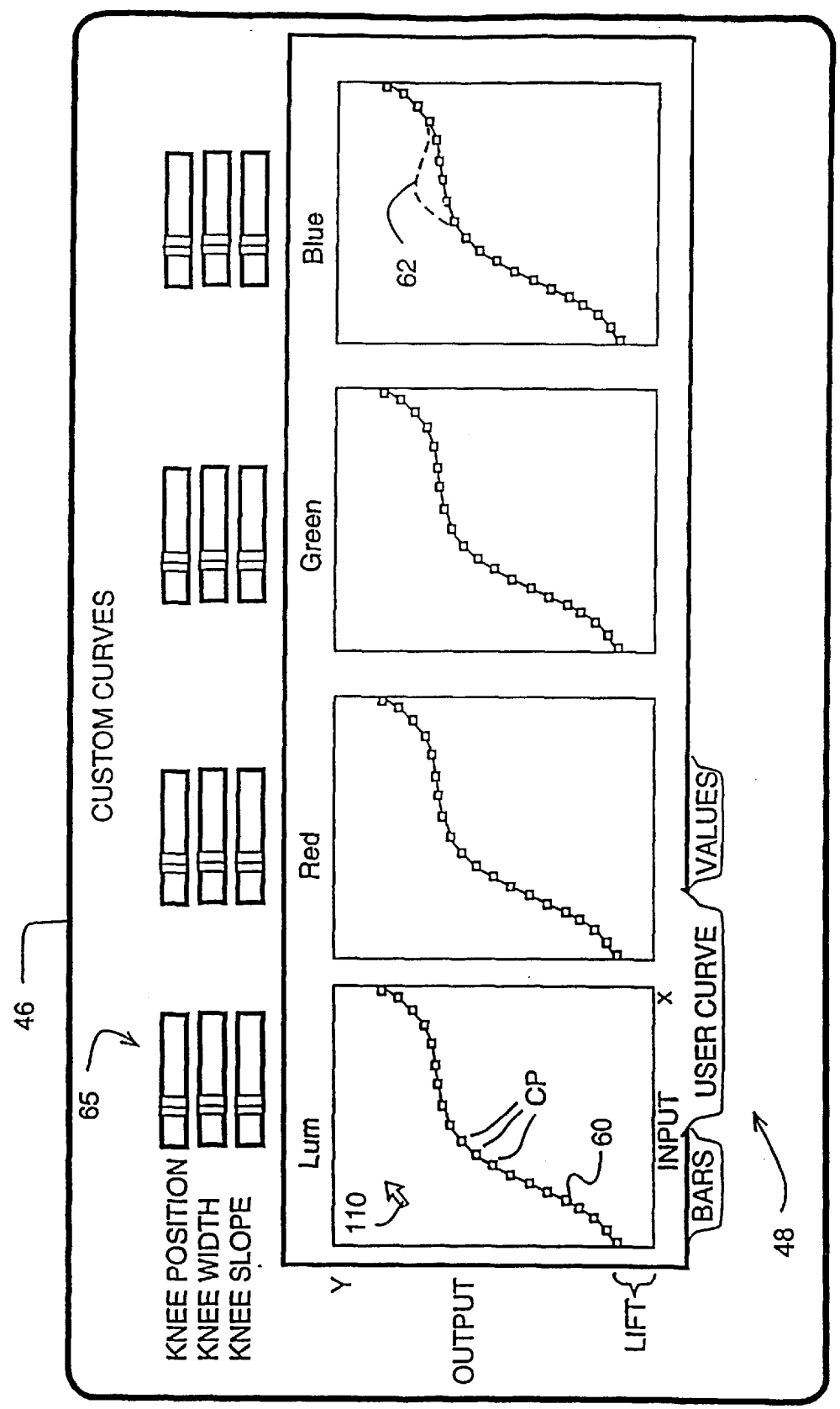
FIG. 2 illustrates a user interface screen for displaying custom gamma curves and allowing operator control of same.

Turn next to FIG. 2 for an overview of custom gamma curves as implemented in the preferred embodiment of the present invention.

It should be understood that in the following discussion of methods involved in the present invention, numerous details are provided such as computer display system elements, aspects of computer program user interfaces, display screens and formats, sample data, etc. in order to provide an understanding of the invention. However, those skilled in the art will understand that the present invention may be practiced without the specific details. Well-known circuits, programming methodologies, and structures are utilized in the present invention but are not described in detail in order not to obscure the present invention.

Certain of the method descriptions which follow are presented in terms of exemplary display images, algorithms, and symbolic representations of operations of data within the computer's memory. As will be known to those skilled in the programming arts, and particularly those skilled in object-oriented programming methodologies, these algorithmic descriptions and graphic exemplary displays are the means used by those skilled in the art of computer programming and computer construction to convey teachings and discoveries to others skilled in the art.

For purposes of this discussion, an "algorithm" is generally a sequence of computer-executed steps leading to a desired result. These steps require physical manipulations of physical quantities. Usually, though not necessarily, these quantities take the form of electrical, magnetic, or optical signals that are capable of being stored, transferred, combined, compared, or otherwise manipulated. It is conventional for those skilled in the art to refer to these signals as bits, values, elements, symbols, characters, images, terms, numbers, or the like. It should be kept in mind, however, that these and similar terms should be associated with appropriate physical quantities inside the computer and that these are merely convenient labels applied to these physical quantities that exist within the computer.

It should also be understood that manipulations within the computer are often referred to in terms such as adding, comparing, moving, etc. which are often associated with mental operations performed by a human operator. It must be understood that no involvement of a human operator is necessary or even desirable in many aspects of the present invention, since the operations described herein (except those specifically identified as origination with the operator or user) are machine operations performed in conjunction with a human operator or user that interacts with the computer. The machines used for performing the operation of the present invention, as will be understood, include general purpose digital computers or other similar computing devices.

Furthermore, it should be kept in mind that there is a distinction between the methods, steps, or operations carried out by a computer, and the method of computation itself. The present invention does not involve a method of computation. The present invention rather relates to methods, steps, or operations for a computer and processing electrical or other physical signals to generate desired physical signals and display results and interactions. As illustrated in FIG. 1, the present invention also relates to a system 10 for performing these operations. Furthermore, it should be understood that the programs, algorithms, etc. described herein are not related or limited to any particular computer or apparatus. Rather, various types of general purpose machines may be used with programs constructed in accordance with the teachings herein, and employed as the workstation 12. Similarly, it may prove advantageous to construct specialized apparatus to perform the method steps described herein by way of dedicated computer systems with hard-wired logic or programs stored in nonvolatile memory such as read only memory.

FIG. 2 illustrates in more detail the custom curve window 46 displayed on the workstation monitor 15. The custom curves window preferably comprises a view of the gamma curves, e.g. curve 60 of the luminance, red, green, and blue channels. The value of lift can be seen as the point at which each curve crosses the y (output) axis, while the gain is the highest value of y (output). All of the curves show a generally downwardly-opening (concave down) type curve, indicating a gamma of less than one for most points along the curve. A plurality of control points (CP) are shown, all of which are selectable by the operator using the cursor such as that shown at 110.

In accordance with one aspect of the invention, note that the gamma curve for the blue channel has a bump or knee 62, indicative of a subgamma function applied to the blue channel. The position, width, and slope of this knee is controlled by three knee sliders 65 labeled as knee position, knee width, and knee slope, respectively. Three knee sliders are provided for each of the luminance, red, green, and blue channels. One or more knees may be provided in accordance with the present invention.

Figures 6, 7:
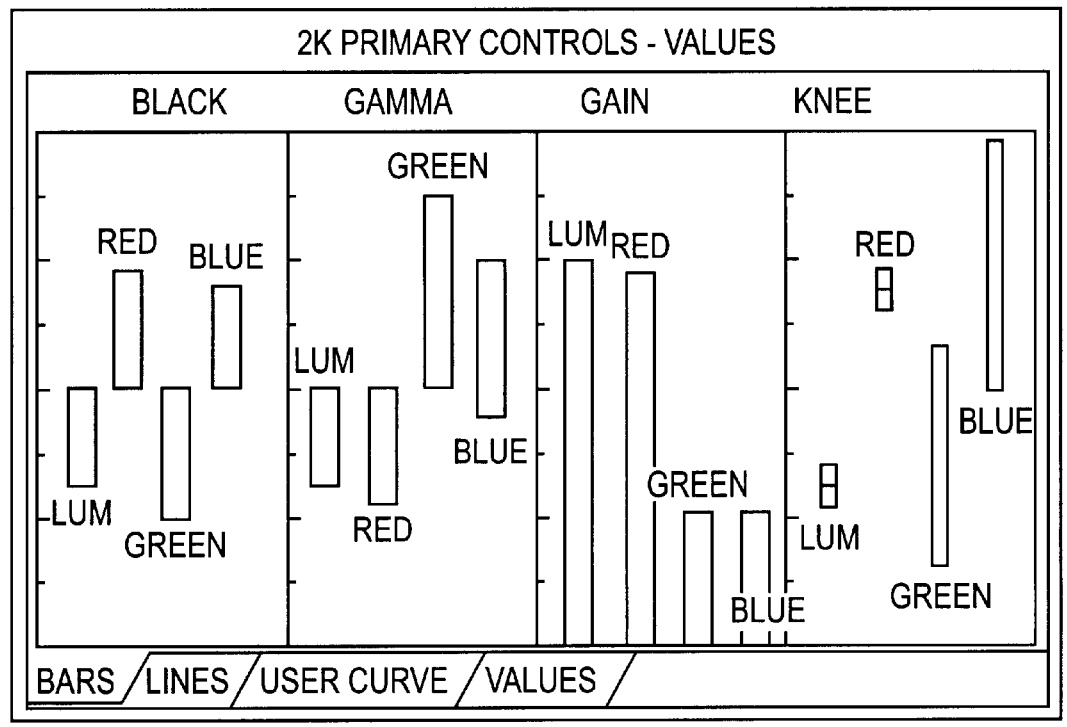
FIG. 6 illustrates an alternative user interface screen for the described custom curves generator.
FIG. 7 illustrates an alternative user interface screen for the described custom curves generator.

The custom curve window 46 further includes selectable tabs 48 that allow the operator to select different types of user controls for the custom gamma curve feature. These tabs may be actuated in the known manner by pointing with the cursor and clicking. Clicking on the "bars" tab causes display of a "Bars" display as shown in FIG. 6. Clicking on the "Values" tab causes display of a "Values" display as shown in FIG. 7. Clicking on the "User Curve" tab causes display of the shape of the user curve as shown in FIG. 2.

FIG. 3 illustrates the aspects of knee position, knee width, and knee slope in greater detail, in the context of a single channel (for example red). This illustrates the manner in which the operator can control the aspects of the position, width, and slope of a given subgamma curve or knee, as will be described.

Figure 3A:
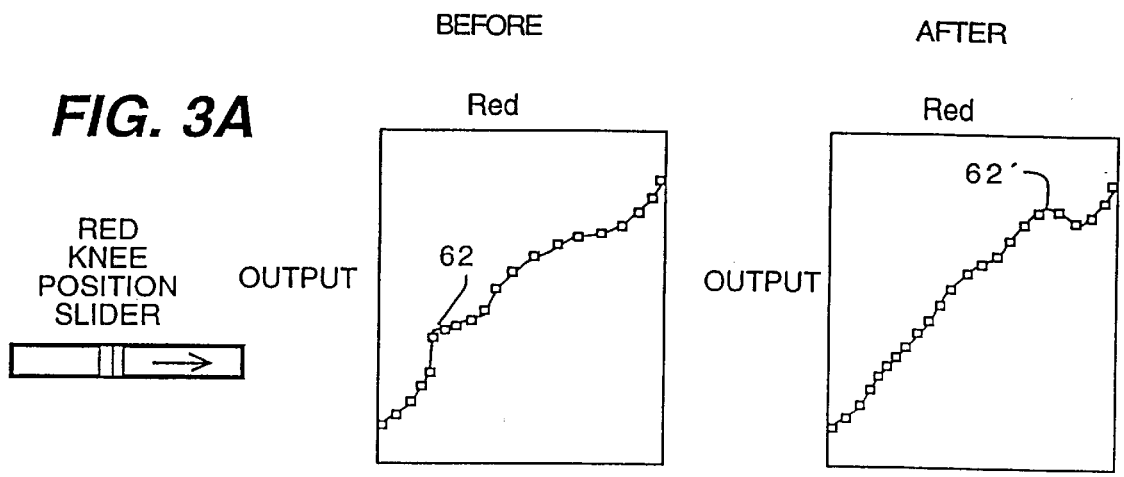
FIGS. 3A through 3C, illustrate a subgamma curve or "knee" with controllable aspects of knee position, knee width, and knee slope.

In FIG. 3A, the parameter of "knee position" can be adjusted to change the location of a subgamma curve 62. Adjustment of the knee position slider control in the user interface changes the position of the knee 62 in the BEFORE column to that of 62' in the AFTER column. The effect is to change the location (i.e. values) of the various control points (CP) that define the knee. Other control points are not affected by the adjustment.

Figure 3B:
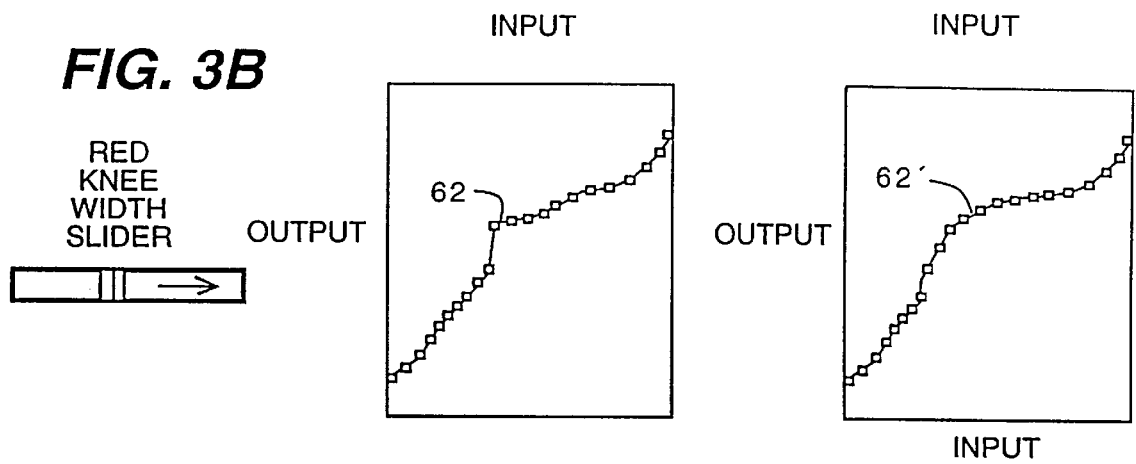

In FIG. 3B, the parameter of "knee width" can be adjusted to change the width of a subgamma curve 62. Adjustment of the knee width slider control in the user interface changes the width of the knee 62 in the BEFORE column to that of 62' in the AFTER column. The effect is to change the location (i.e. values) of the various control points (CP) that define the knee. Other control points are not affected by the adjustment.

Figure 3C:
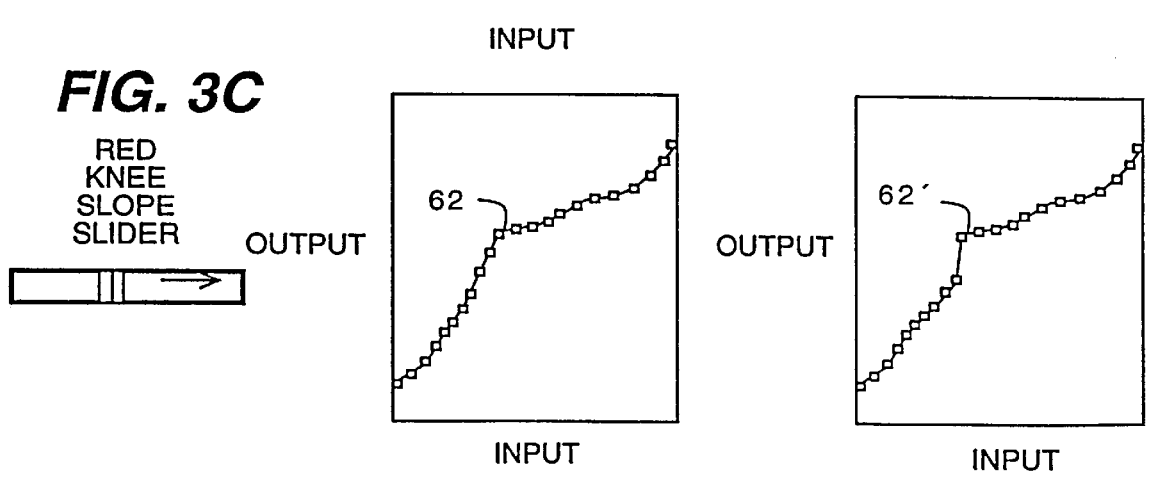

In FIG. 3C, the parameter of "knee slope" can be adjusted to change the stretch or degree of slope of a subgamma curve 62. Adjustment of the knee slope slider control in the user interface changes the instantaneous slope of the knee 62 in the BEFORE column to that of 62' in the AFTER column. The effect is to change the location (i.e. values) of the various control points (CP) that define the knee. Other control points are not affected by the adjustment.

Figure 4:
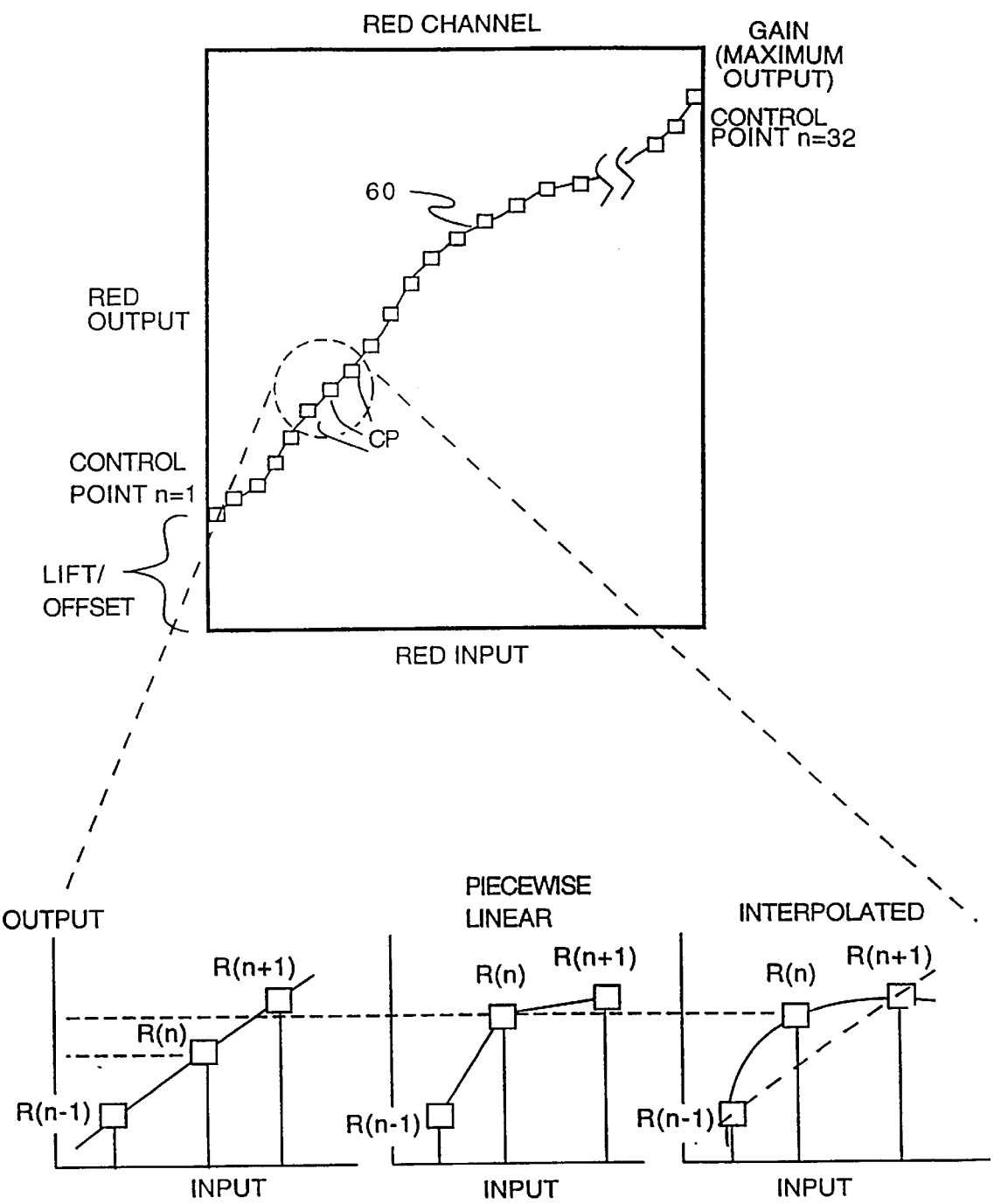
FIG. 4 illustrates an exemplary custom gamma curve for the red channel, with an illustrative interpolation curve applied to a selected set of control points.

FIG. 4 illustrates an exemplary custom gamma curve 60 for the red channel, and the manner in which triples of the control points CP are employed to compute the interpolation between control points. As described above, up to 32 control points are provided in the disclosed embodiment; each of these control points can be selectively moved by the operator by dragging them up or down in y (output). Alternatively, the control points may be adjusted by the slider controls 65 for knee position, knee width, and knee slope, or the numeric values of the knee position, knee width, and knee slope can be adjusted as will be described in later user interface screens.

In accordance with one aspect of the invention, the custom gamma curve generator circuit 33 is operative to compute and apply a non-linear interpolation function between a control point immediately preceding a given control point and a control point immediately subsequent to a given control point. The five most significant bits of the 14-bit input value are employed to select one of the 32 control points, while the remaining 9 bits are employed in the interpolation function.

Assume in FIG. 4 that the 3 control points (CP) R(n), R(n+1), and R(n−1) are involved in determining the instantaneous output value as adjusted by a custom gamma curve. With a gamma=1, the gamma curve would be a straight line, as shown in the lowermost left hand portion of FIG. 4.

If the central control point R(n) were adjusted (but the values of R(n+1) and R(n−1) were not adjusted), without the present invention, a piece-wise linear representation would occur as shown in the lowermost central portion of FIG. 4. Note the discontinuity at R(n) which occurs because of the use of piecewise linear segments. If the slope of R(n−1) to R(n) was high (steep) relative to the slope of R(n) to R(n+1), a small change in the input signal near R(n) could result in a visual artifact due to the discontinuity.

In accordance with the present invention, however, a smooth curve is drawn between the three control points. As shown in the lowermost right hand portion in FIG. 4, a smooth curve is drawn between the values of R(n−1), R(n), and R(n+1) as the result of application of an interpolation function for input values of the red signal. Therefore, small changes in the values of the input signal do not cause artifacts in the output signal, as there are no discontinuities at or near the control point values.

The preferred embodiment employs a "sinc" function for the interpolation function. The preferred mathematical relationship is as follows:

$$\frac{\sin(x)}{x} \cdot \frac{1+\cos(x)}{2}$$

Those skilled in the art will understand and appreciate how to compute this function and store the values in a memory such as a read only memory (ROM). This interpolation function is computed and applied as a function of the 9 LSBs of the instantaneous value of the input signal, e.g. the red input video signal.

FIGS. 8A, 8B, and 8C are a C++ printout of this interpolation function.

Those skilled in the art will understand that other types of interpolation functions can also be employed, so long as the objective of a smooth (continuous) transition between plural control points is effected.

Figure 5:
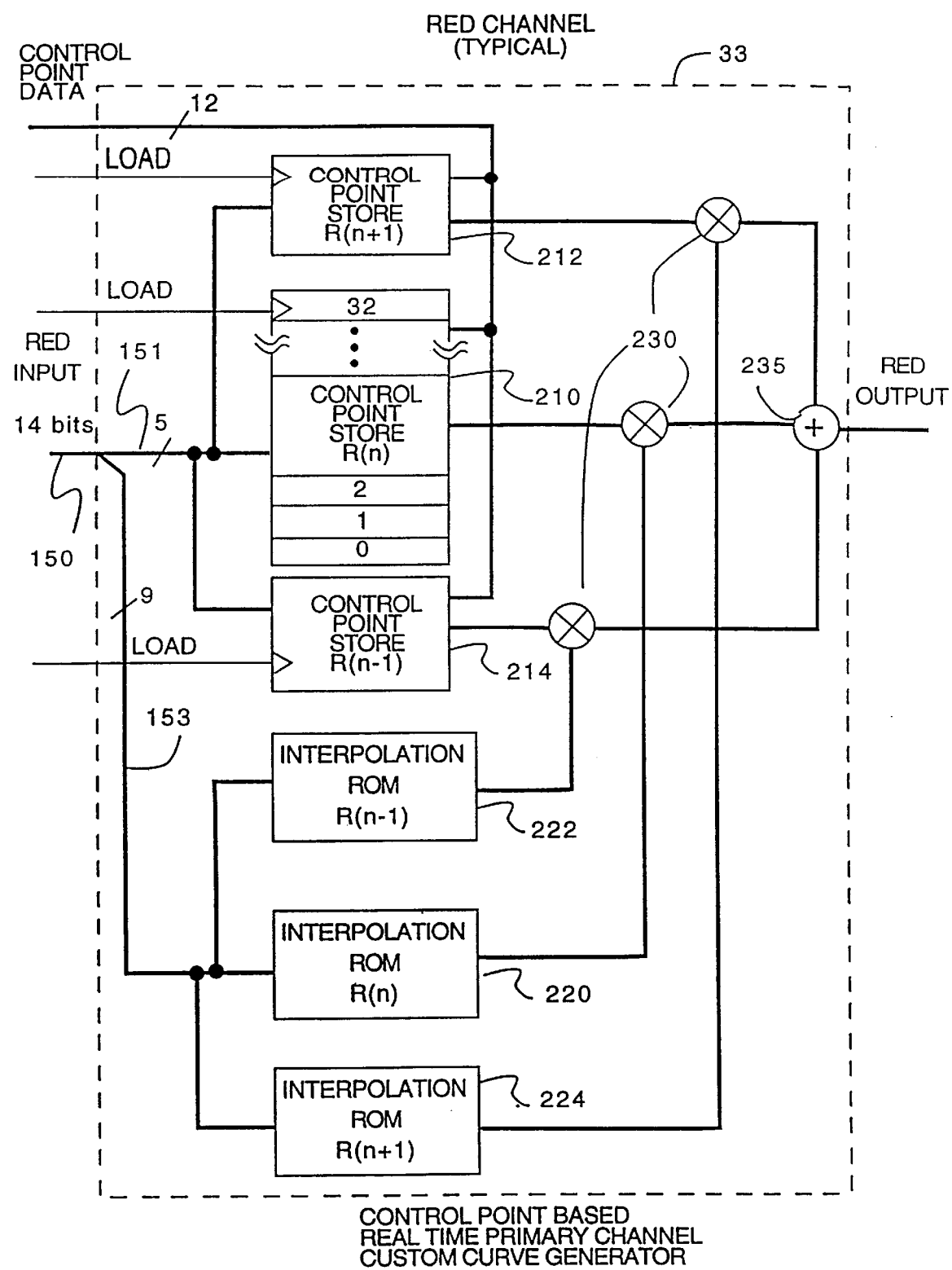
FIG. 5 is a schematic diagram of the custom curve generator circuit constructed in accordance with the preferred embodiment of the present invention.

FIG. 5 illustrates a typical custom gamma curve generator circuit 33 for computing a custom gamma curve for a typical channel, e.g. red. It will be understood that a separate circuit 33 is provided for each of the luminance, red, green, and blue channels, but only the red channel will be described. The input signal for the circuit is a 14-bit digital signal provided on line 150.

The custom gamma curve generator circuit 33 comprises a first control point store 210 for storing the value of the control point R(n), a second control point store 212 for storing the value of the immediately subsequent control point R(n+1), and a third control point store 214 for storing the value of the immediately preceding control point R(n−1). These control point stores are all preferably constructed with high speed random access memory, with 32 locations, that are accessed by addressing with the most significant five bits of the 14-bit input signal as provided on lines 151.

Each of the control point storage memories 210, 212, 214 is loaded with a LOAD signal with the digital value of the control point produced as a result of operator control such as adjusting a slider control, actually entering a value, dragging on a control bar, as will be described. The value of the control point is established by operator interaction via a user interface to software that controls the display of the custom gamma curves, as shown in FIG. 2.

The preferred sinc interpolation function is precalculated and stored in interpolation read only memories (ROM) 220, 222, 224. The least significant 9 bits of the 14-bit input signal are provided on lines 153 to address these ROMs. The interpolation ROM 220 for the control point R(n), the interpolation ROM 222 for the immediately preceding control point R(n−1), and the interpolation ROM 224 for the immediately subsequent control point value R(n+1). The instantaneous value of the input signal is thus used to address the interpolation ROMs and obtain an interpolation factor that is applied to the values of the three control points R(n), R(n−1), and R(n+1).

The outputs of the interpolation ROMs 220, 222, 224 are applied respectively to the values of the respective control points, e.g. the output of the interpolation ROM 222 for the control point R(n−1) applied to the value of the control point R(n−1) as obtained from the control point store 214 for the value R(n−1).

The interpolation function is applied by multiplying the interpolation factors from the interpolation ROMs by their respective control point values and then summing the results. The outputs of the control points stores and interpolation values are multiplied with multipliers 230, and summed with an adder 235 to form the output signal e.g., Red Output. Preferably, a 14-bit output signal is maintained.

Those skilled in the art will now appreciate that the custom gamma curve generator circuit 33 allows an operator to set and adjust the value of a control point and still effect a smooth, continuous transition between values of the input signal.

In accordance with another aspect of the invention, an operator may adjust the control points comprising the custom curves in a variety of different manners. In the user interface of FIG. 2, the operator may adjust the location of any one of the 32 control points for any one of the luminance, red, green, and blue channels by clicking on a control point and dragging the control point in the y-direction (up or down). If desired, the operator may manually create a "knee" such as that shown at 62 by moving a plurality of control points to define the knee graphically.

If desired, the operator may create and adjust a knee (e.g. such as knee 62) by manipulating one or more of the knee control sliders 65 for a selected channel. Moving one of the knee control sliders such as knee position, knee width, and knee slope automatically adjusts the values of a plurality of control points, obviating control of the control points one point at a time. Some operators may find this type of control preferable to separate control of the control points by pointing and clicking.

The system is responsive to the operator's interactions to determine the values of the control points for the respective channel being viewed and manipulated, and store the values in the memory of the workstation 12, in association with a particular scene or frame of a scene if desired. The values of the custom curve are then automatically retrieved from memory of the workstation and loaded into the RAM of the custom curve circuit in real time, on a frame by frame basis if desired. A system constructed as described herein is not limited to any particular number of custom gamma curves, or any particular shapes; the only limit is the amount of memory made available in the workstation memory for storing custom curve information.

FIG. 6 illustrates an alternative selectable user interface entitled "Bars" for the black, gamma, gain and "knee" parameters. A separate appropriately color-coded bar (e.g. gray for luminance, red for the red channel, blue for the blue channel, and green for the green channel) is provided for each of these parameters. The operator can adjust the black, gamma, gain, or knee parameters for each of these channels by clicking on an appropriately colored bar associated with a particular parameter to be adjusted, and dragging the upper or lower limits of the bar upwardly or downwardly. The respective values of the control points will adjust correspondingly.

FIG. 7 illustrates yet another alternative and selectable user interface for the custom gamma curves equipment entitled "Values." This user interface allows an operator to enter an actual value via typing at a keyboard for the parameters of black (lift), gain, and gamma, knee position, knee width, and knee slope, for each of the luminance, red, green, and blue channels. Adjustment of the actual digital values causes the control point values to be adjusted accordingly.

Those skilled in the art will understand how to program the workstation 12 to effect these various user interfaces.

In view of the foregoing description of the preferred embodiments of the present invention, other embodiments will suggest themselves to those skilled in the art. Therefore, the scope of the present invention is to be limited only by the claims set forth below.

What is claimed is:

1. Image processing system for use in color correction equipment comprising:
   a gamma curve generator circuit to generate a gamma curve, the gamma curve having a subgamma curve; and
   a curve user interface for adjusting the gamma curve, the curve user interface comprising:
   a display to display the gamma curve; and
   user controls selectively operable to adjust the subgamma curve of the displayed gamma curve.

2. The system of claim 1, wherein the subgamma curve comprises a knee and the user controls comprise a selectable adjuster for varying a position of the knee along the gamma curve.

3. The system of claim 1, wherein the subgamma curve comprises a knee and the user controls comprise a selectable adjuster for varying a width of the knee along the gamma curve.

4. The system of claim 1, wherein the subgamma curve comprises a knee and the user controls comprise a selectable adjuster for varying a slope of the knee along the gamma curve.

5. The system of claim 1, wherein the gamma curve generator circuit comprises:
   a control point memory for storing control point values defining the gamma curve;
   an interpolation factor memory for storing interpolation factors of an interpolation function;
   means responsive to an instantaneous input signal for a video signal channel for accessing one of the stored control point values and for accessing those stored control point values which are immediately before and after the accessed one of the stored control point values; and
   means responsive to the instantaneous input signal for the video signal channel for applying the stored interpolation factors to the accessed control point values.

6. The system of claim 5, wherein the gamma curve generator circuit further comprises:
   means for receiving adjustments to the stored control point values from the curve user interface.

7. The system of claim 1, wherein:
   the displayed gamma curve comprises a plurality of control points and the subgamma curve comprises a set of control points of the plurality of control points; and
   the user controls selectively modify the set of the control points simultaneously while substantially unchanging the remaining control points of the plurality of control points.

8. The system of claim 7, wherein the gamma curve generator circuit receives a luminance channel to create a luminance channel gamma curve; and
   further comprising a plurality of RGB gamma curve generator circuits for receiving a red channel, a green channel and a blue channel to create a red channel gamma curve, a green channel gamma curve and a blue channel gamma curve, respectively.

9. The system of claim 8, wherein:
   the display comprises:
   a first view for displaying the luminance channel gamma curve;
   a second view for displaying the red channel gamma curve;

a third view for displaying the green channel gamma curve; and a fourth view for displaying the blue channel gamma curve; and the user controls comprises:
  a plurality of separate position slide adjusters for a luminance channel, a red channel, a green channel, and blue channel to adjust a position of the subgamma curve along the luminance channel gamma curve, the red channel gamma curve, the green channel gamma curve and the blue channel gamma curve, respectively;
  a plurality of separate width slide adjusters for the luminance channel, the red channel, the green channel, and the blue channel to adjust a width of the subgamma curve of the luminance channel gamma curve, the red channel gamma curve, the green channel gamma curve and the blue channel gamma curve, respectively; and
  a plurality of separate slope slide adjusters for the luminance channel, the red channel, the green channel, and the blue channel to adjust a slope of the subgamma curve of the luminance channel gamma curve, the red channel gamma curve, the green channel gamma curve and the blue channel gamma curve, respectively.

10. The system of claim 9, wherein the user controls further comprise:
  a plurality of selectable tabs to alternate between different modes of the user controls to modify the gamma curve and the subgamma curve.

11. The system of claim 10, wherein the plurality of selectable tabs includes:
  a curve tab for selecting a curve user interface display displaying the luminance, red, green and blue channel gamma curves and the plurality of separate position, width and slope slide adjusters.

12. The system of claim 10, wherein the plurality of selectable tabs includes:
  a bar tab for selecting a bar adjustment user interface display, the bar adjustment user interface display comprises:
    a first set of bar adjusters for adjusting a lift or black level parameter of the luminance, red, green and blue channel gamma curves;
    a second set of bar adjusters for adjusting a gamma parameter of the luminance, red, green and blue channel gamma curves;
    a third set of bars for adjusting a gain parameter of the luminance, red, green and blue channel gamma curves; and
    a fourth set of bars for adjusting values of the set of control points defining the knee or the subgamma curve of the luminance, red, green and blue channel gamma curves.

13. The system of claim 12, wherein:
  the first set of bar adjusters, the second set of bar adjusters and the third set of bar adjusters each comprise:
    a plurality of separate channel bars for adjusting the luminance, red, green and blue channel gamma curves, each channel bar is adjusted with respect to a reference scale; and
  the fourth set of bar adjusters comprises:
    a plurality of separate channel knee bars for adjusting the knee or subgamma curve of the luminance, red, green and blue gamma curves, each channel knee bar is adjusted with respect to a reference scale.

14. The system of claim 13, wherein said each channel knee bar comprises:
  an upper limit and a lower limit wherein adjusting the upper limit or the lower limit upwardly or downwardly with reference to the reference scale adjusts a parameter of the knee or the subgamma curve.

15. The system of claim 14, wherein the parameter of the knee or the subgamma curve includes the position, the width, and the slope.

16. The system of claim 10, wherein the plurality of selectable tabs includes:
  a values tab for selecting a values adjustment user interface display, the values adjustment user interface display comprises:
    a set of data entry fields for entering or adjusting numerical values for lift or a black level of the luminance, red, green and blue channel gamma curves;
    a set of data entry fields for entering or adjusting numerical values for a gamma of the luminance, red, green and blue channel gamma curves;
    a set of data entry fields for entering or adjusting numerical values for a gain of the luminance, red, green and blue channel gamma curves;
    a set of data entry fields for entering or adjusting numerical values for a subgamma curve position of the luminance, red, green and blue channel gamma curves;
    a set of data entry fields for entering or adjusting numerical values for a subgamma curve width of the luminance, red, green and blue channel gamma curves; and
    a set of data entry fields for entering or adjusting numerical values for a subgamma curve slope of the luminance, red, green and blue channel gamma curves.

17. The system of claim 7, further comprising:
  means for selecting and dragging a control point of the plurality of control points to adjust the gamma curve.

18. The system of claim 17, wherein the gamma curve generator circuit comprises:
  means for creating a smooth gamma curve having a smooth, continuous transition between the control points.

19. Image processing system for use in color correction equipment comprising:
  a gamma curve generator circuit to generate a gamma curve;
  a curve user interface for adjusting the gamma curve, the curve user interface comprising:
    a display to display the gamma curve; and
    user controls selectively operable to create or adjust a position, width and slope of a subgamma curve along the displayed gamma curve.

20. The system of claim 19, wherein the gamma curve generator circuit comprises:
  a control point memory for storing control point values defining the gamma curve;
  an interpolation factor memory for storing interpolation factors of an interpolation function;
  means responsive to an instantaneous input signal for a video signal channel for accessing one of the stored control point values and for accessing those stored control point values which are immediately before and after the accessed one of the stored control point values; and means responsive to the instantaneous input signal for the video signal channel for applying the stored interpolation factors to the accessed control point values.

21. The generator circuit of claim 20, wherein the gamma curve generator circuit further comprises:

means for receiving adjustments to the stored control point values from the curve user interface.

22. The system of claim 19, wherein:

the displayed gamma curve comprises a plurality of control points and the subgamma curve comprises a set of control points of the plurality of control points; and the user controls selectively modify the set of the control points simultaneously while substantially unchanging the remaining control points of the plurality of control points.

23. The system of claim 22, wherein the gamma curve generator circuit receives a luminance channel to create a luminance channel gamma curve; and further comprising a plurality of RGB gamma curve generator circuits for receiving a red channel, a green channel and a blue channel to create a red channel gamma curve, a green channel gamma curve and a blue channel gamma curve, respectively.

24. The system of claim 23, wherein:

the display comprises:
  a first view for displaying the luminance channel gamma curve;
  a second view for displaying the red channel gamma curve;
  a third view for displaying the green channel gamma curve; and
  a fourth view for displaying the blue channel gamma curve; and the user controls comprises:
  a plurality of separate position slide adjusters for a luminance channel, a red channel, a blue channel, and green channel to adjust the position of the subgamma curve along the luminance channel gamma curve, the red channel gamma curve, the green channel gamma curve and the blue channel gamma curve, respectively;
  a plurality of separate width slide adjusters for the luminance channel, the red channel, the green channel, and the blue channel to adjust the width of the subgamma curve of the luminance channel gamma curve, the red channel gamma curve, the green channel gamma curve and the blue channel gamma curve, respectively; and
  a plurality of separate slope slide adjusters for the luminance channel, the red channel, the green channel, and the blue channel to adjust the slope of the subgamma curve of the luminance channel gamma curve, the red channel gamma curve, the green channel gamma curve and the blue channel gamma curve, respectively.

25. The system of claim 24, wherein the user controls further comprise:

a plurality of selectable tabs to alternate between different modes of user controls to modify the gamma curve and subgamma curve.

26. The system of claim 25, wherein the plurality of selectable tabs includes:

a curve tab for selecting a curve user interface display displaying the luminance, red, green and blue channel gamma curves and the plurality of separate position, width and slope slide adjusters.

27. The system of claim 25, wherein the plurality of selectable tabs includes:

a bar tab for selecting a bar adjustment user interface display, the bar adjustment user interface display comprises:
  a first set of bar adjusters for adjusting a lift or black level parameter of the plurality of control points of the luminance, red, green and blue channel gamma curves;
  a second set of bar adjusters for adjusting a gamma parameter of the plurality of control points of the luminance, red, green and blue channel gamma curves;
  a third set of bars for adjusting a gain parameter of the plurality of control points of the luminance, red, green and blue channel gamma curves; and
  a fourth set of bars for adjusting values of the set of control points defining the subgamma curve of the luminance, red, green and blue channel gamma curves.

28. The system of claim 27, wherein:

the first set of bar adjusters, the second set of bar adjusters and the third set of bar adjusters each comprise:
  a plurality of separate channel bars for adjusting the luminance, red, green and blue channel gamma curves, each channel bar is adjusted with respect to a reference scale; and the fourth set of bar adjusters comprises:
  a plurality of separate channel knee bars for adjusting the subgamma curve of the luminance, red, green and blue gamma curves, each channel knee bar is adjusted with respect to a reference scale.

29. The system of claim 28, wherein said each channel knee bar comprises:

an upper limit and a lower limit wherein adjusting the upper limit or the lower limit upwardly or downwardly with reference to the reference scale adjusts at least one of the position, the width, and the slope of the subgamma curve.

30. The system of claim 25, wherein the plurality of selectable tabs includes:

a values tab for selecting a values adjustment user interface display, the values adjustment user interface display comprises:
  a set of data entry fields for entering values for lift or a black level parameter of the luminance, red, green and blue channel gamma curves;
  a set of data entry fields for entering or adjusting numerical values for a gamma parameter of the luminance, red, green and blue channel gamma curves;
  a set of data entry fields for entering or adjusting numerical values for a gain parameter of the luminance, red, green and blue channel gamma curves;
  a set of data entry fields for entering or adjusting numerical values for the subgamma curve position of the luminance, red, green and blue channel gamma curves;
  a set of data entry fields for entering or adjusting numerical values for the subgamma curve width of the luminance, red, green and blue channel gamma curves; and
  a set of data entry fields for entering or adjusting numerical values for the subgamma curve slope of the luminance, red, green and blue channel gamma curves.

31. The system of claim 22, further comprising:
means for selecting and dragging a control point of the plurality of control points to adjust the gamma curve.

32. The system of claim 31, wherein the gamma curve generator circuit comprises:
means for creating a smooth gamma curve having a smooth, continuous transition between the control points.

33. A method of correcting a gamma curve of a video signal channel comprising the steps of:
displaying a gamma curve having a plurality of control points of a video signal channel, the gamma curve includes a subgamma curve; and,
manually adjusting, via a user interface, a subgamma curve having a set of control points within the plurality of control points of the displayed gamma curve.

34. The method of claim 33, wherein the manually adjusting step further comprises the step of:
varying a position, a width or a slope of the subgamma curve along the displayed gamma curve.

35. The method of claim 33, wherein the displaying step comprises:
storing control point values defining the gamma curve;
storing interpolation factors of an interpolation function;
accessing, responsive to an instantaneous input signal for the video signal channel, one of the stored control point values;
accessing those stored control point values which are immediately before and after the accessed one of the stored control point values; and
applying, responsive to the instantaneous input signal for the video signal channel, the stored interpolation factors to the accessed control point values.

36. The method of claim 33, wherein the manually adjusting step automatically adjusts the set of the control points simultaneously while substantially unchanging the remaining control points of the plurality of control points.

37. The system of claim 33, wherein the displaying step includes the step of:
creating a smooth gamma curve having a smooth, continuous transition between the control points.

38. The method of claim 33, wherein manually adjusting step comprises the step of:
entering position, width and slope values in position, width and slope designated data entry field associated with the gamma curves.

39. The method of claim 33, wherein manually adjusting step comprises the step of:
adjusting an upper limit or lower limit of a bar adjuster with reference to a reference scale associated with the gamma curve to vary at least one of the position, the width and the slope.

40. The method of claim 33, further comprising the steps of:
manually adjusting a lift or black level, a gain or a gamma parameter of the displayed gamma curve.

41. A method of correcting a gamma curve of a luminance channel and RGB channels comprising the steps of:
displaying a luminance channel gamma curve having a plurality of control points, the luminance channel gamma curve includes a luminance channel subgamma curve;
displaying the red channel gamma curve having a plurality of control points, the red channel gamma curve includes a red channel subgamma curve;
displaying the blue channel gamma curve having a plurality of control points, the blue channel gamma curve includes a blue subgamma curve;
displaying the green channel gamma curve having a plurality of control points, the green channel gamma curve includes a green channel subgamma curve; and
manually adjusting simultaneously a set of control points defining one of the luminance, red, blue, and green channel subgamma curves via a user interface.

42. The method of claim 41, wherein the manually adjusting step further comprises the step of:
varying a position, width or slope of the one subgamma curve.

43. The method of claim 41, wherein manually adjusting step comprises the step of:
entering position, width and slope values in position, width and slope designated data entry field associated with one of the luminance, red, green and blue subgamma curves.

44. The method of claim 41, wherein manually adjusting step comprises the step of:
adjusting an upper limit or lower limit of a bar adjuster with reference to a reference scale associated with one of the luminance, red, green and blue subgamma curves to vary at least one of the position, the width and the slope.

45. The method of claim 41, further comprising the steps of:
manually adjusting a lift or black level of one of the luminance, red, green and blue gamma curves.

46. The method of claim 45, where in manually adjusting the lift or black level includes the step of:
entering a lift or black level value in a lift or black level designated data entry field associated with one of the luminance, red, green and blue gamma curves.

47. The method of claim 45, wherein manually adjusting the lift or black level includes the step of:
adjusting an upper limit or lower limit of a bar adjuster with reference to a reference scale associated with one of the luminance, red, green and blue gamma curves to vary the lift or the black level.

48. The method of claim 41, further comprising the steps of:
manually adjusting a gain of one of the luminance, red, green and blue gamma curves.

49. The method of claim 48, wherein manually adjusting the gain includes the step of:
entering a value in a gain designated data entry field associated with one of the luminance, red, green and blue gamma curves.

50. The method of claim 48, wherein manually adjusting the Gain includes the step of:
adjusting an upper limit or lower limit of a bar adjuster with reference to a reference scale associated with one of the luminance, red, green and blue gamma curves to vary the gain.

51. The method of claim 41, further comprising
the manually adjusting a respective one of the displayed luminance, red, green and blue gamma curves wherein the manually adjusting a respective one of the displayed luminance, red, green and blue gamma curves comprises the steps of:
selecting a control point of the plurality of control points; and
dragging the selected control point to adjust one of the displayed luminance, red, green and blue gamma curves.

52. A control point based real time primary gamma curve generator circuit for color correction equipment, comprising:

a control point memory for storing control point values defining control points of a gamma curve;

an interpolation function memory for storing interpolation factors of an interpolation function;

means responsive to an instantaneous input signal for a channel for accessing one of the stored control point values and for accessing those stored control point values which are immediately before and after the accessed one of the stored control point values; and means responsive to the instantaneous input signal for the channel for applying the stored interpolation factors to the accessed control point values.

53. The generator circuit of claim 52, further comprising means for receiving adjustments to the stored control point values from the color correction equipment.

54. The generator circuit of claim 52, wherein the channel comprises one of a luminance channel, a red channel, a green channel and a blue channel.

55. The generator circuit of claim 52, wherein:

the control point memory is random access memory; and the interpolation function memory is read only memory.

56. The generator circuit of claim 55, wherein:

the instantaneous signal comprises a control point address portion to identify the accessed one of the control point values stored in the control point memory and an interpolation address portion to access the interpolation factors stored in the interpolation function memory.

57. The generator circuit of claim 56, wherein the interpolation function applying, means comprises:

a plurality of multipliers to multiply the accessed control point values by the interpolation factors, each multiplier having an output.

58. The generator circuit of claim 57, further comprising:

an adder for adding the output of said each multiplier.

59. The generator circuit of claim 57, further comprising:

an adder for adding the output of said each multiplier to form an output signal defined by a smooth gamma curve having a smooth, continuous transition between the control points.

60. A method of generating a gamma curve for a video signal channel for color correction equipment, comprising:

storing control point values defining control points of the gamma curve for the video signal channel;

storing interpolation factors of an interpolation function;

receiving an instantaneous signal;

responsive to the receipt of the instantaneous signal, accessing one of the store control point values for the video signal channel;

responsive to the receipt of the instantaneous signal, accessing those stored control point values which are immediately before and after the accessed one of the stored control point values;

applying the stored interpolation factors to the accessed control point values to create an interpolated output for each of the accessed control point values; and, generating the gamma curve for the given channel from the interpolated outputs.

61. The generator circuit of claim 60, further comprising the method steps of:

receiving adjustments to the stored control point values from the color correction equipment.

62. The generator circuit of claim 60, wherein the video signal channel comprises one of a luminance channel, a red channel, a green channel and a blue channel.

63. The generator circuit of claim 60, wherein the instantaneous signal comprises a control point address portion identifying the one of the stored control point values and an interpolation address portion identifying the stored interpolation factors.

64. The generator circuit of claim 60, wherein the applying step comprises:

multiplying the accessed control point values by the interpolation factors to create the interpolated outputs.

65. The generator circuit of claim 64, wherein the generating step comprises:

adding the interpolated outputs to form the gamma curve having a smooth, continuous transition between the control points.

* * * * *